United States Patent
Wada

(10) Patent No.: US 11,089,222 B2
(45) Date of Patent: *Aug. 10, 2021

(54) SHAKE CORRECTION DEVICE, SHAKE CORRECTION METHOD, SHAKE CORRECTION PROGRAM, LENS DEVICE, AND IMAGING DEVICE

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,340

(22) Filed: Mar. 31, 2020

(65) Prior Publication Data
US 2020/0228714 A1 Jul. 16, 2020

Related U.S. Application Data

(63) Continuation of application No. 16/285,225, filed on Feb. 26, 2019, now Pat. No. 10,652,467, which is a continuation of application No. PCT/JP2017/017098, filed on Apr. 28, 2017.

(30) Foreign Application Priority Data

Sep. 7, 2016 (JP) .............................. JP2016-174393

(51) Int. Cl.
H04N 5/228 (2006.01)
H04N 5/232 (2006.01)
G03B 5/00 (2021.01)

(52) U.S. Cl.
CPC .......... *H04N 5/23287* (2013.01); *G03B 5/00* (2013.01); *H04N 5/23254* (2013.01); *H04N 5/23258* (2013.01)

(58) Field of Classification Search
CPC ................................................. H04N 5/23254
See application file for complete search history.

(56) References Cited

U.S. PATENT DOCUMENTS 6,429,895 B1 8/2002 Onuki
10,652,467 B2 * 5/2020 Wada ....................... G03B 5/00
(Continued)

FOREIGN PATENT DOCUMENTS

CN 104219441 12/2014
CN 105264419 1/2016
(Continued)

OTHER PUBLICATIONS

"International Search Report (Form PCT/ISA/210) "of PCT/JP2017/017098, dated Jul. 4, 2017, with English translation thereof, pp. 1-5.
(Continued)

Primary Examiner — Gary C Vieaux
(74) Attorney, Agent, or Firm — JCIPRNET

(57) ABSTRACT

A shake correction device that corrects a shake of a captured image captured by an imager which images subjects through an imaging optical system, and includes: a movement detection sensor as defined herein; a drive mechanism as defined herein; an optical splitter as defined herein; a subject light detector as defined herein; and a processor as defined herein, and the processor calculates distances of the subjects formed on the light receiving surface of the subject light detector from the imaging optical system based on output signals of the subject light detector, and detects the movement amount as the second movement in a case where a movement amount of the subject of which the distance is maximum exceeds a threshold value.

21 Claims, 4 Drawing Sheets

(56) References Cited

U.S. PATENT DOCUMENTS

| | | |
|---|---|---|
| 2002/0097324 A1 | 7/2002 | Onuki |
| 2007/0230937 A1* | 10/2007 | Ide ................... H04N 5/232122 396/125 |
| 2009/0309985 A1 | 12/2009 | Ibi |
| 2014/0354860 A1 | 12/2014 | Yuge et al. |
| 2016/0057445 A1 | 2/2016 | Tsubaki |
| 2016/0094781 A1 | 3/2016 | Ebato et al. |
| 2016/0105612 A1 | 4/2016 | Yuge et al. |
| 2017/0013198 A1 | 1/2017 | Wada |
| 2019/0191093 A1* | 6/2019 | Wada ................. H04N 5/23287 |

FOREIGN PATENT DOCUMENTS

| | | |
|---|---|---|
| JP | H10191135 | 7/1998 |
| JP | 2001356380 | 12/2001 |
| JP | 2006119199 | 5/2006 |
| JP | 2009300614 | 12/2009 |
| JP | 2010-054883 | 3/2010 |
| JP | 2012-163772 | 8/2012 |
| JP | 2014-025967 | 2/2014 |
| WO | 2015145858 | 10/2015 |

OTHER PUBLICATIONS

"International Preliminary Report on Patentability (Form PCT/IPEA/409) of PCT/JP2017/017098", dated Dec. 14, 2018, with English translation thereof, pp. 1-17.

"Office Action of U.S. Appl. No. 16/285,225", dated Oct. 2, 2019, pp. 1-15.

Office Action of China Counterpart Application, with English translation thereof, dated Jul. 30, 2020, pp. 1-10.

* cited by examiner

SHAKE CORRECTION DEVICE, SHAKE CORRECTION METHOD, SHAKE CORRECTION PROGRAM, LENS DEVICE, AND IMAGING DEVICE

CROSS REFERENCE TO RELATED APPLICATION

This is a continuation of and claims the priority benefit of U.S. patent application Ser. No. 16/285,225, filed on Feb. 26, 2019, now allowable, which is a continuation of International Application No. PCT/JP2017/017098 filed on Apr. 28, 2017, and claims priority from Japanese Patent Application No. 2016-174393 filed on Sep. 7, 2016, the entire disclosures of which are incorporated herein by reference.

BACKGROUND OF THE INVENTION

1. Field of the Invention

The present invention relates to a shake correction device, a shake correction method, a computer readable medium storing a shake correction program, a lens device, and an imaging device.

2. Description of the Related Art

As an imaging device comprising an imaging element which images subjects through an imaging optical system or a lens device which is used while being attached to the imaging device, there is a device having a shake correction function for correcting shake of a captured image caused by vibration of the device.

For example, in the lens device, shake correction is performed by detecting vibration of the device on the basis of information from a movement detection sensor such as an acceleration sensor or an angular velocity sensor mounted on the lens device and moving a correction lens included in the imaging optical system in a plane perpendicular to an optical axis so as to cancel the detected vibration.

In the imaging device, shake correction is performed by detecting vibration of the device on the basis of information from a movement detection sensor such as an acceleration sensor or an angular velocity sensor mounted on the imaging device and moving one or both of a correction lens included in the imaging optical system or the imaging element in a plane perpendicular to an optical axis so as to cancel the detected vibration.

JP1998-191135A (JP-H10-191135A), JP2012-163772A, and JP2014-025967A describe an imaging device which performs shake correction by driving the correction lens included in the imaging optical system on the basis of the information from the movement detection sensor.

The imaging device described in JP1998-191135A (JP-H10-191135A) corrects the shake of the captured image caused by vibration from a low frequency to high frequency by detecting vibration of very low frequency which is not detectable by the movement detection sensor by performing image processing on the captured image captured through the correction lens and driving the correction lens so as to cancel the detected vibration.

The imaging device described in JP2012-163772A calculates a correction value for correcting an offset of the movement detection sensor on the basis of the information of the movement detection sensor.

SUMMARY OF THE INVENTION

A direct current component (offset component) generated in a case where there is no vibration and a noise component mixed from outside are included in the output of the movement detection sensor used in the shake correction. Thus, it is necessary to perform the shake correction on the assumption that an offset component and a noise component are absent in order to improve the accuracy of the shake correction.

JP1998-191135A (JP-H10-191135A) and JP2014-025967A do not describe a method of correcting the offset component and the noise component of the movement detection sensor.

In JP2012-163772A, since the offset component of the movement detection sensor is calculated by performing movement averaging or low-pass filtering on the output signal of the movement detection sensor, there is a possibility that an error will be caused in the calculated offset component.

The present invention has been made in view of the circumstances, and an object of the present invention is to provide a shake correction device, a shake correction method, a shake correction program, a lens device, and an imaging device which are capable of performing shake correction with high accuracy.

A shake correction device of the present invention is a shake correction device that corrects a shake of a captured image captured by an imager which images subjects through an imaging optical system. The device comprises a movement detection sensor that outputs a signal corresponding to a movement of the shake correction device, a drive mechanism that controls positions of subject light rays incident on a light receiving surface of the imager by driving at least one of a part of lenses included in the imaging optical system or the imager, an optical splitter that divides an optical path of subject light rays incident on the imaging optical system into a first optical path which leads to the imager and a second optical path other than the first optical path in a position closer to the subject than a driven member driven by the drive mechanism, a subject light detector that detects the subject light rays which are incident on the imaging optical system and travel through the second optical path, a processor that detects the movement of the shake correction device on the basis of the subject light rays detected by the subject light detector, and controls the drive mechanism on the basis of a first movement of the shake correction device based on the signal and a second movement detected by the processor.

A shake correction method of the present invention is a shake correction method using a shake correction device that corrects a shake of a captured image captured by an imager which images subjects through an imaging optical system. The shake correction device includes a movement detection sensor that outputs a signal corresponding to a movement of the shake correction device, a drive mechanism that controls positions of subject light rays incident on a light receiving surface of the imager by driving at least one of a part of lenses included in the imaging optical system or the imager, and an optical splitter that divides an optical path of subject light rays incident on the imaging optical system into a first optical path which leads to the imager and a second optical path other than the first optical path in a position closer to the subject than a driven member driven by the drive mechanism. The method comprises a movement detection step of detecting the movement of the shake correction device on the basis of the subject light rays which are incident on the imaging optical system and travel through the second optical path, and a drive control step of controlling the drive mechanism on the basis of a first movement of the shake correction device based on the signal and a second movement detected in the movement detection step.

A shake correction program of the present invention causes a computer of a shake correction device that corrects a shake of a captured image captured by an imager which images subjects through an imaging optical system to perform a shake correction method. The shake correction device includes a movement detection sensor that outputs a signal corresponding to a movement of the shake correction device, a drive mechanism that controls positions of subject light rays incident on a light receiving surface of the imager by driving at least one of a part of lenses included in the imaging optical system or the imager, and an optical splitter that divides an optical path of subject light rays incident on the imaging optical system into a first optical path which leads to the imager and a second optical path other than the first optical path in a position closer to the subject than a driven member driven by the drive mechanism. The shake correction method comprises a movement detection step of detecting the movement of the shake correction device on the basis of the subject light rays which are incident on the imaging optical system and travel through the second optical path, and a drive control step of controlling the drive mechanism on the basis of a first movement of the shake correction device based on the signal and a second movement detected in the movement detection step.

A lens device of the present invention comprises the shake correction device, and the imaging optical system.

An imaging device of the present invention comprises the shake correction device, and the imager.

According to the present invention, it is possible to provide a shake correction device, a shake correction method, a shake correction program, a lens device, and an imaging device which are capable of performing shake correction with high accuracy.

DESCRIPTION OF THE PREFERRED EMBODIMENTS

Figure 1:
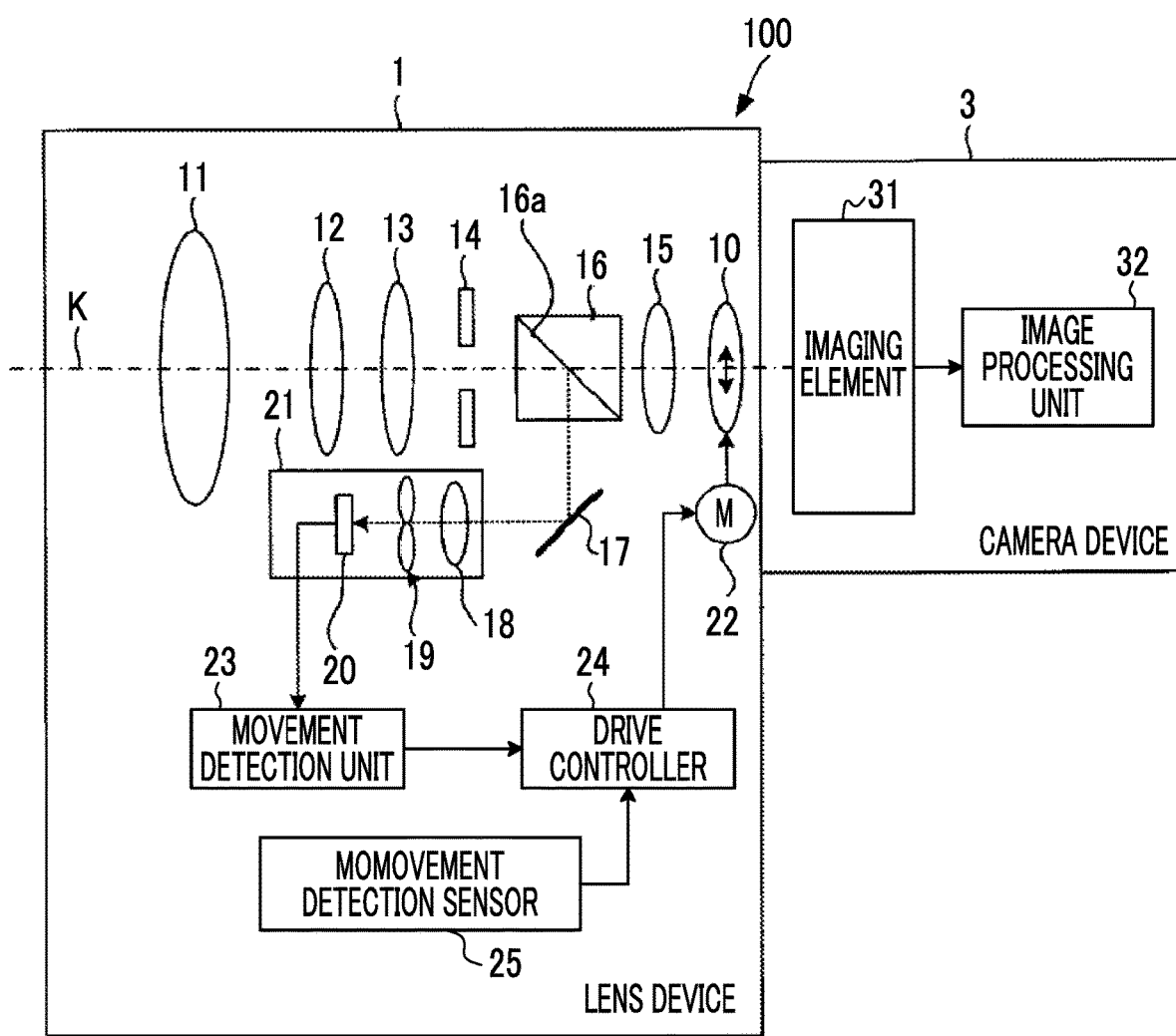
FIG. 1 is a schematic diagram showing a schematic configuration of a camera system 100 according to an embodiment of the present invention.

Hereinafter, an embodiment of the invention will be described by referring to the drawings.

FIG. 1 is a schematic diagram showing a schematic configuration of a camera system 100 according to an embodiment of the invention. The camera system 100 is suitable for camera systems 100 for business such as broadcasting or movie.

The camera system 100 shown in FIG. 1 comprises a lens device 1 and a camera device 3 as an imaging device to which the lens device 1 is attached.

The lens device 1 comprises an imaging optical system which includes a plurality of lenses and a stop 14. In the example of FIG. 1, the plurality of lenses includes a focus lens 11, zoom lenses 12 and 13 for changing a focal length, a master lens group 15, and a shake correction lens 10.

The focus lens 11, the zoom lenses 12 and 13 for changing the focal length, the stop 14, the master lens group 15, and the shake correction lens 10 are arranged in order from the lens close to a subject.

The shake correction lens 10 is supported so as to be movable on a plane perpendicular to an optical axis K of the imaging optical system. The shake correction lens 10 constitutes a part of lenses of the plurality of lenses included in the imaging optical system.

The lens device 1 further comprises a beam splitter 16 including a reflection surface 16a, a mirror 17, a light detection unit 21 which includes a condenser lens 18, a separator lens 19, and a sensor 20, a drive mechanism 22, a movement detection unit 23, a drive controller 24, and a movement detection sensor 25.

The drive mechanism 22 moves the shake correction lens 10 in a plane perpendicular to the optical axis K by driving the shake correction lens 10. Thus, the drive mechanism controls incidence positions of subject light rays incident on a light receiving surface of the imaging element 31 on the light receiving surface through the imaging optical system. For example, the drive mechanism 22 is constituted by a motor such as a stepping motor. The shake correction lens 10 constitutes a driven member driven by the drive mechanism 22.

The beam splitter 16 is disposed between the stop 14 and the master lens group 15 on the optical axis K.

The beam splitter 16 is an optical element which divides an optical path of the subject light rays incident on the imaging optical system of the lens device 1 into a first optical path which leads to the imaging element 31 and a second optical path (an optical path toward the mirror 17) other than the first optical path in a position closer to the subject than the shake correction lens 10 which is the driven member. The beam splitter 16 transmits some (for example, 80% of the subject light rays) of subject light rays which are incident on the imaging optical system and pass through the stop 14, and reflects the remaining light rays (for example, 20% of the subject light rays) acquired by subtracting the some of the subject light rays from the reflection surface 16a in a direction perpendicular to the optical axis K.

The position of the beam splitter 16 is not limited to the position shown in FIG. 1, and the beam splitter may be positioned behind the lens of the imaging optical system closest to the subject on the optical axis K and before the shake correction lens 10. A half mirror may be used as the beam splitter 16.

The mirror 17 is disposed on an optical path of the light rays reflected from the reflection surface 16a of the beam splitter 16. Thus, the light rays are reflected, and are incident on the condenser lens 18 of the light detection unit 21.

The condenser lens 18 concentrates the light rays reflected from the mirror 17.

The separator lens 19 is composed of two lenses arranged in a line in one direction.

The subject light rays concentrated by the condenser lens 18 pass through the two lenses, and form images in different positions on a light receiving surface (a surface on which a plurality of pixels is arranged) of the sensor 20. That is, a pair of subject light images shifted in one direction is formed on the light receiving surface of the sensor 20.

The beam splitter 16 and the mirror 17 causes some of the subject light rays incident on the imaging optical system to be incident on the imaging element 31 of the camera device 3 that images the subject through the imaging optical system and causes the remaining subject light rays acquired by removing the some of the subject light rays to be incident on the sensor 20. The mirror 17 may be removed, and the light rays reflected by the beam splitter 16 may be directly incident on the condenser lens 18.

The sensor 20 is an area sensor in which a plurality of pixels is arranged on a light receiving surface in two dimensions, and outputs image signals corresponding to the two subject light images formed on the light receiving surface. That is, the sensor 20 is a sensor that outputs a pair of image signals shift in one direction from one subject light image formed by the imaging optical system.

Among the pixels included in the sensor 20, the pixel that outputs one of the pair of image signals shifted in one direction constitutes a first signal detection section that receives one luminous flux of the pair of luminous fluxes passing through two different portions arranged in one direction of the pupil region of the imaging optical system and detects the signal corresponding to a light reception amount.

Among the pixels included in the sensor 20, the pixel that outputs the other one of the pair of image signals shifted in one direction constitutes a second signal detection section that receives the other luminous flux of the pair of luminous fluxes and detects the signal corresponding to a light reception amount.

As the sensor 20, a pair of a first pixel that receives one luminous flux of the pair of luminous fluxes passing through the two different portions arranged in one direction of the pupil region of the imaging optical system and detects the signal corresponding to the light reception amount and a second pixel that receives the other one luminous flux of the pair of luminous fluxes and detect the signal corresponding to the light reception amount may be used so as to be arranged in two dimensions on the entire light receiving surface. In this case, the condenser lens 18 and the separator lens 19 are not required.

The sensor 20 functions as a subject light detection unit that is disposed at the second optical path and detects the subject light rays which are incident on the imaging optical system and travel through the second optical path.

The movement detection sensor 25 is a sensor that outputs a signal corresponding to the movement of the lens device 1 which is a device having the movement detection sensor therein, and is constituted by an angular velocity sensor or an acceleration sensor.

The movement detection unit 23 detects the movement of the lens device 1 on the basis of the subject light rays detected by the sensor 20, and inputs the detected movement to the drive controller 24.

A system controller which includes various processors (not shown), a read only memory (ROM), and a random access memory (RAM) is included in the lens device 1. The movement detection unit 23 and the drive controller 24 are functional blocks which are constituted by the processor executing a shake correction program stored in the ROM.

The various processors include a central processing unit (CPU) which is a general-purpose processor that performs various processing by executing a program, a programmable logic device (PLD) which is a processor capable of changing a circuit configuration after a field programmable gate array (FPGA) is manufactured, or a dedicated electric circuit which is a processor having a circuit configuration designed as a dedicated circuit in order to perform specific processing such as application specific integrated circuit (ASIC).

More specifically, the configurations of the various processors are electric circuits obtained by combining circuit elements such as semiconductor elements.

The system controller may be constituted by one among various processors, or may be constituted by a combination of the same kind or different kinds of two or more processors (for example, a combination of a plurality of FPGAs or a combination of a CPU and a FPGA).

The drive controller 24 performs an offset correction process of correcting an offset of a signal output from the movement detection sensor 25 by subtracting an offset value from the signal and an amplification process of amplifying a signal obtained after the offset correction process by using a predetermined gain, and calculates a first movement of the lens device 1 on the basis of the signal obtained after the amplification process.

The drive controller 24 controls the drive mechanism 22 on the basis of the first movement and second movement detected by the movement detection unit 23. The drive mechanism 22 drives the shake correction lens 10 through the control of the drive controller 24.

The system controller has a function of calculating a phase difference on the basis of the pair of image signals output from the sensor 20 and calculating a defocus amount on the basis of the calculated phase difference. The focus lens 11 is driven in a direction of the optical axis K by a motor (not shown). This motor drives the focus lens 11 on the basis of the defocus amount calculated by the system controller, and thus, the focus of the imaging optical system is adjusted.

The camera device 3 includes the imaging element 31 such as a charge coupled device (CCD) type image sensor or a complementary metal oxide semiconductor (CMOS) type image sensor disposed on the optical axis K of the lens device 1, and an image processing unit 32 that generates captured image data by processing image signals acquired by imaging the subject light images by the imaging element 31.

The beam splitter 16, the sensor 20, the drive mechanism 22, the movement detection unit 23, the drive controller 24, and the movement detection sensor 25 included in the lens device 1 constitutes a shake correction device that corrects the shake of the captured image captured by the imaging element 31 which images the subject through the imaging optical system.

An operation of the camera system 100 having the aforementioned configuration will be described.

Figure 2:
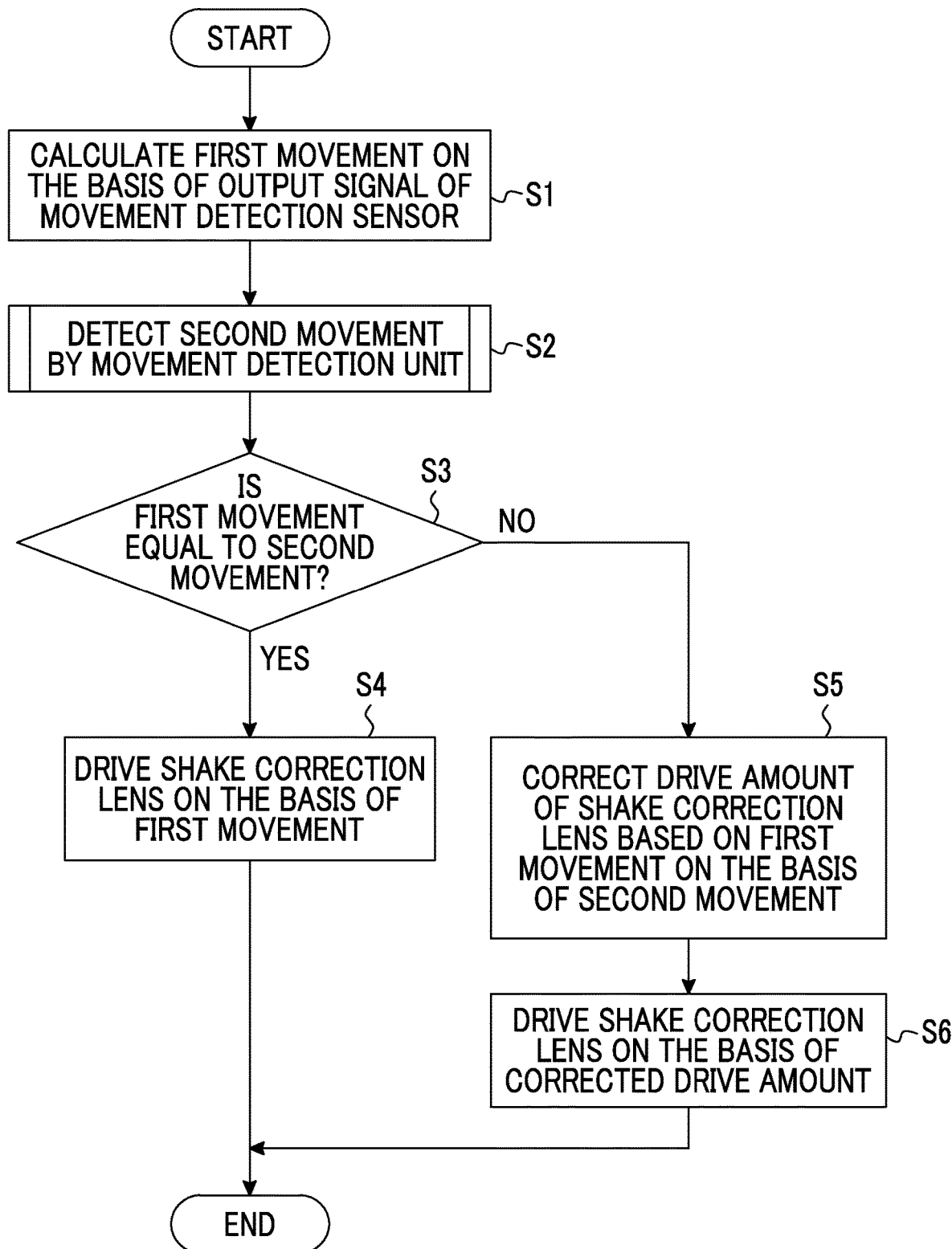
FIG. 2 is a flowchart for describing an operation of the camera system 100 shown in FIG. 1.

FIG. 2 is a flowchart for describing the operation of the camera system 100 shown in FIG. 1.

During the activation of the camera system 100, the signal corresponding to the movement of the lens device 1 is output from the movement detection sensor 25, and the first movement of the lens device 1 is calculated by the drive controller 24 on the basis of the signal obtained after the offset correction and amplification processes of the output signal (step S1). In a case where the calculated first movement exceeds a threshold value Th1 as a reference for determining that the lens device 1 is intentionally moved, the drive controller 24 treats that the first movement as "zero (0)".

During the activation of the camera system 100, some of the subject light rays incident on the imaging optical system are incidence on the sensor 20, and the sensor 20 outputs the pair of image signals corresponding to the subject light rays to the movement detection unit 23. The movement detection unit 23 detects the second movement of the lens device 1 on the basis of the image signals which are output from the sensor 20 and correspond to two adjacent frames (step S2).

Figure 3:
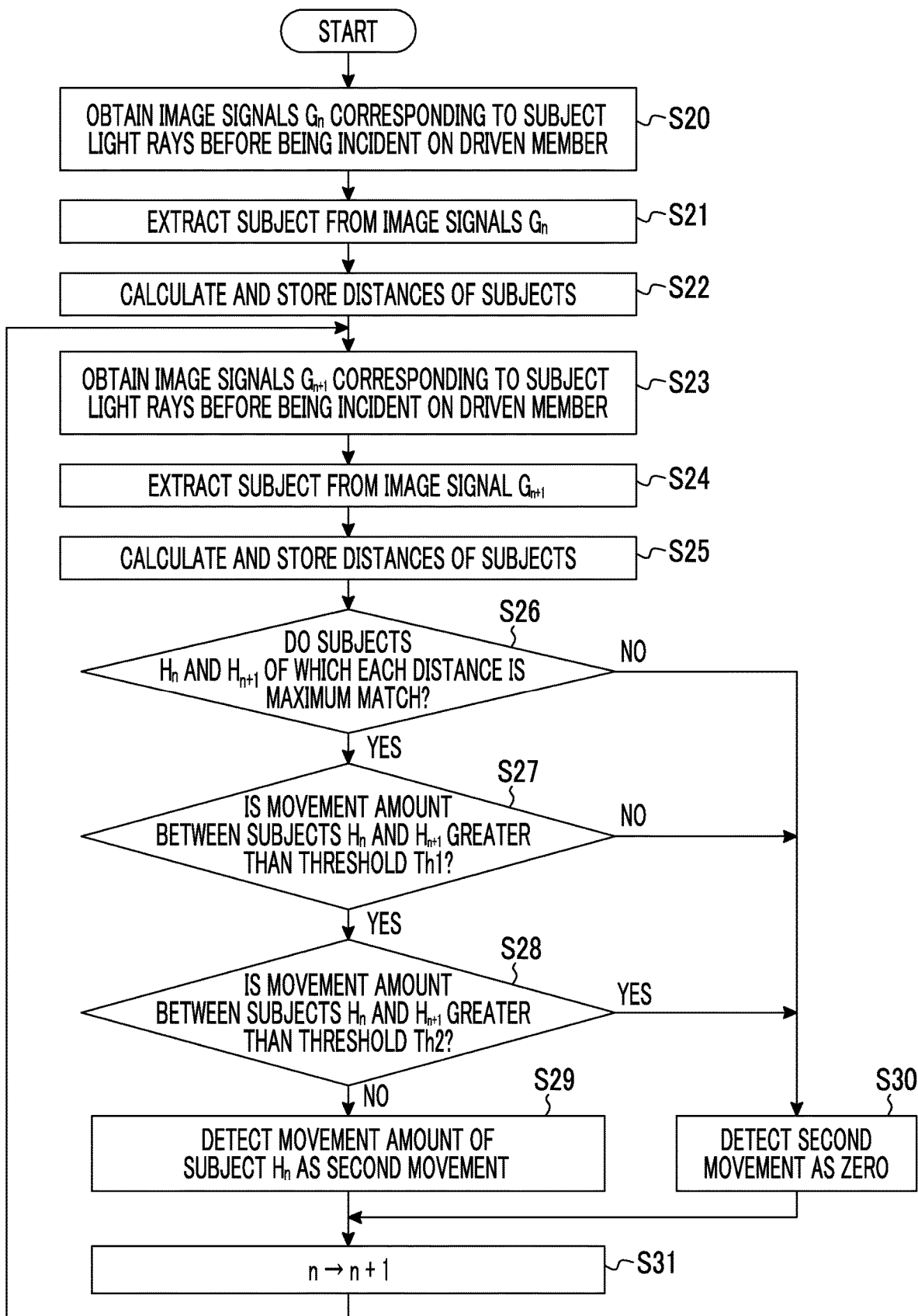
FIG. 3 is a flowchart for describing the details of step S2 shown in FIG. 2.

FIG. 3 is a flowchart for describing the details of step S2 shown in FIG. 2.

The movement detection unit 23 obtains a pair of image signals $G_n$ output from the sensor 20, and stores the obtained pair of signals in the RAM (step S20). "n" is a value indicating the sequence number of the frame captured by the sensor 20 of the camera system 100. An initial value of "n" is "1". The newer the sequence number of the frame, the larger the value.

Subsequently, the movement detection unit 23 extracts subjects such as a person, a vehicle, a building, and a plant from the pair of image signals $G_n$ by performing a feature point extraction process such as edge extraction (step S21). Since the pair of image signals output from the sensor 20 is converted from the same subject light rays, the same subject is extracted from each of the pair of image signal $G_n$.

Subsequently, the movement detection unit 23 calculates distances from the imaging optical system of the lens device 1 to the subjects for the subjects extracted in step S21, and stores the maximum value (hereinafter, referred to as a distance $L_n$) among the calculated distances in association with information (the shape and size of the subject) of a subject $H_n$ of which distance from the imaging optical system is the distance $L_n$ in the RAM (step S22).

Specifically, the movement detection unit 23 calculates the distance from the imaging optical system to the subject by calculating the phase difference through a correlation calculation between signal groups corresponding to the same subject extracted from the pair of image signals $G_n$ and converting the calculated phase difference into the distance.

In a case where the sensor 20 performs the imaging of the next frame, the movement detection unit 23 obtains a pair of image signals $G_{n+1}$ output from the sensor 20, and stores the obtained pair of image signals in the RAM (step S23).

Subsequently, the movement detection unit 23 extracts the subjects such as a person, a vehicle, a building, and a plant from the pair of image signals $G_{n+1}$ by performing a feature point extraction process such as edge extraction (step S24).

Subsequently, the movement detection unit 23 calculates the distances from the imaging optical system of the lens device 1 to the subjects for the subjects extracted in step S24, and stores the maximum value (hereinafter, referred to as a distance $L_{n+1}$) among the calculated distances in association with information (the shape and size of the subject) of a subject $H_{n+1}$ of which the distance from the imaging optical system is the distance $L_{n+1}$ in the RAM (step S25).

Subsequently, the movement detection unit 23 determines whether or not the information of the subject $H_{n+1}$ matches the information of the subject $H_n$ (step S26).

There is a high possibility that the subject of which the distance from the imaging optical system is maximum will be a subject present in the background of a main subject to be in focus. Thus, a case where the information of the subject $H_{n+1}$ does not match the information of the subject $H_n$ (step S26: NO) means that an imaging range is greatly changed by a panning operation of the lens device 1. Accordingly, the movement detection unit 23 determines that the lens device 1 which requires shake correction does not move in this case, and inputs the second movement as "zero (0)" to the drive controller 24 (step S30).

In a case where the information of the subject $H_{n+1}$ matches the information of the subject $H_n$ (step S26: YES), the movement detection unit 23 calculates a movement amount (specifically, a movement vector) between the subject $H_n+_1$ and the subject $H_n$, and determines that the movement amount exceeds a threshold value Th1 (step S27).

In a case where the movement amount is equal to or less than the threshold value Th1 (step S27: NO), the movement detection unit can determine that the lens device 1 does not nearly move. Thus, the movement detection unit 23 determines that the lens device 1 which requires the shake correction does not move, and inputs the second movement as "zero (0)" to the drive controller 24 (step S30).

In a case where the movement amount exceeds the threshold value Th1 (step S27: YES), the movement detection unit 23 determines whether or not the movement amount exceeds a threshold value Th2 which is greater than the threshold value Th1 (step S28).

In a case where the movement amount exceeds the threshold value Th2 (step S28: YES), the movement detection unit can determine that the lens device 1 is intentionally moved by a user. Thus, the movement detection unit 23 determines that the lens device 1 which requires the shake correction does not move, and inputs the second movement as "zero (0)" to the drive controller 24 (step S30).

In a case where the movement amount is equal to or less than the threshold value Th2 (step S28: NO), the movement detection unit 23 detects the movement amount as the second movement, and inputs the detected second movement to the drive controller 24 (step S29).

After step S29 and step S30, a value of "n" increases by one (step S31), and the process returns to step S23. That is, the subject of which the distance is maximum, which is extracted from the latest frame and the subject of which the distance is maximum, which is extracted from a frame earlier than the latest frame by one are compared. In any one of a case where two subjects do not match, a case where the two subjects match but the movement amount between the two subjects is equal to or less than the threshold value Th1, or a case where the two subjects match but the movement amount between the two subjects exceeds the threshold value Th2, the process of step S30 is performed. In a case where the two subjects match and the movement amount between the two subjects is equal to or less than the threshold value Th2 which is greater than the threshold value Th1, the process of step S29 is performed.

Referring back to FIG. 2, the drive controller 24 determines whether or not the first movement calculated in step S1 and the second movement detected in step S2 match (step S3). A case where the first movement and the second movement match means that a difference value (an absolute value without regard to its sign) between the first movement and the second movement is equal to or less than a predetermined value.

In a case where the determination of step S3 is YES, the drive controller 24 determines a drive amount of the shake correction lens 10 on the basis of the first movement calculated in step S1, and drives the shake correction lens 10 on the basis of the determined drive amount (step S4). That is, the drive controller 24 corrects the shake of the captured image captured by the imaging element 31 by moving the shake correction lens 10 through the drive mechanism 22 so as to cancel the first movement of the lens device 1.

In a case where the determination of step S3 is NO, the drive controller 24 corrects the drive amount of the shake correction lens 10 based on the first movement calculated in step S1 on the basis of the second movement detected in step S2 (step S5).

For example, the drive controller 24 corrects the offset value used in the offset correction process, corrects the gain used in the amplification process, or corrects both the offset value and the gain such that the first movement matches the second movement. Accordingly, since the correction is performed such that the first movement matches the second movement, the drive amount based on the first movement is also corrected.

As another method, the drive controller 24 may calculate the first drive amount based on the first movement and the second drive amount based on the second movement, and may perform the correction (for example, may replace the first drive amount with the second drive amount) such that the first drive amount matches the second drive amount.

For example, in a case where the second movement is "zero (0)" and the first movement is "a value other than zero (0)", the drive controller 24 sets the first drive amount as "zero (0)", increases or decreases the offset value by the difference value between the first movement and the second movement, or sets the gain as "zero (0)" in step S5.

After step S6, the drive controller 24 drives the shake correction lens 10 on the basis of the corrected drive amount (step S6).

In FIG. 2, step S2 constitutes a movement detection step, and step S1 and step S3 to step S6 constitute a drive control step.

As stated above, according to the camera system 100 of FIG. 1, the drive amount of the shake correction lens 10 is determined on the basis of the first movement of the lens device 1 based on the output signal of the movement detection sensor 25 and the second movement of the lens device 1 detected by the movement detection unit 23. Since the second movement is detected on the basis of light which is incident on the imaging optical system but is not incident on the shake correction lens 10 yet, the second movement accurately reflects the movement of the camera system 100. Thus, an offset component of the movement detection sensor 25 is changed with time or is changed by a usage environment, or noise is mixed in the output of the movement detection sensor 25. As a result, an error is caused in the first movement. Even in this case, it is possible to accurately correct the shake of the captured image by correcting this error. Especially in a stationary state, it is possible to detect an accurate offset component of the movement detection sensor 25 by information of the movement detected by the movement detection unit 23. In a case where the gain is "zero (0)", it is possible to eliminate the influence of a noise component mixed in the output of the movement detection sensor 25 in the stationary state.

According to the camera system 100 of FIG. 1, the movement detection unit 23 calculates the distances of the subjects present within the imaging range of the sensor 20, and detects the second movement of the lens device 1 on the basis of the movement (specifically, the background of the main subject) of the subject of which the distance is maximum. According this configuration, for example, even in a case where the main subject occupies most part of the imaging range of the sensor 20 and the main subject moves, it is possible to determine whether or not the lens device 1 slightly moves on the basis of the movement of the background of the main subject, and it is possible to detect a slight movement of the lens device 1 which requires the shake correction with high accuracy.

In the camera system 100 of FIG. 1, the movement detection unit 23 detects the second movement of the lens device 1 on the basis of the output signal of the sensor 20 used for adjusting the focus of the imaging optical system. As stated above, since it is possible to improve the accuracy of the shake correction by using the sensor 20 provided for a purpose other than the shake correction, it is possible to reduce the manufacturing cost of the lens device 1.

The lens device 1 of FIG. 1 may have a configuration in which the condenser lens 18 and the separator lens 19 are removed and the imaging element having a light receiving surface on which imaging pixels are arranged in two dimensions is used as the sensor 20. In this configuration, the movement detection unit 23 detects the second movement of the lens device 1 by comparing the image signals of the two adjacent frames captured by the sensor 20 and calculating a movement vector between the two image signals. Even in this configuration, it is possible to improve the accuracy of the shake correction. In this configuration, it is possible to use a line sensor as the sensor 20.

Although the shake correction device is provided in the lens device 1 in the camera system 100 of FIG. 1, the shake correction device may have the camera device 3.

Figure 4:
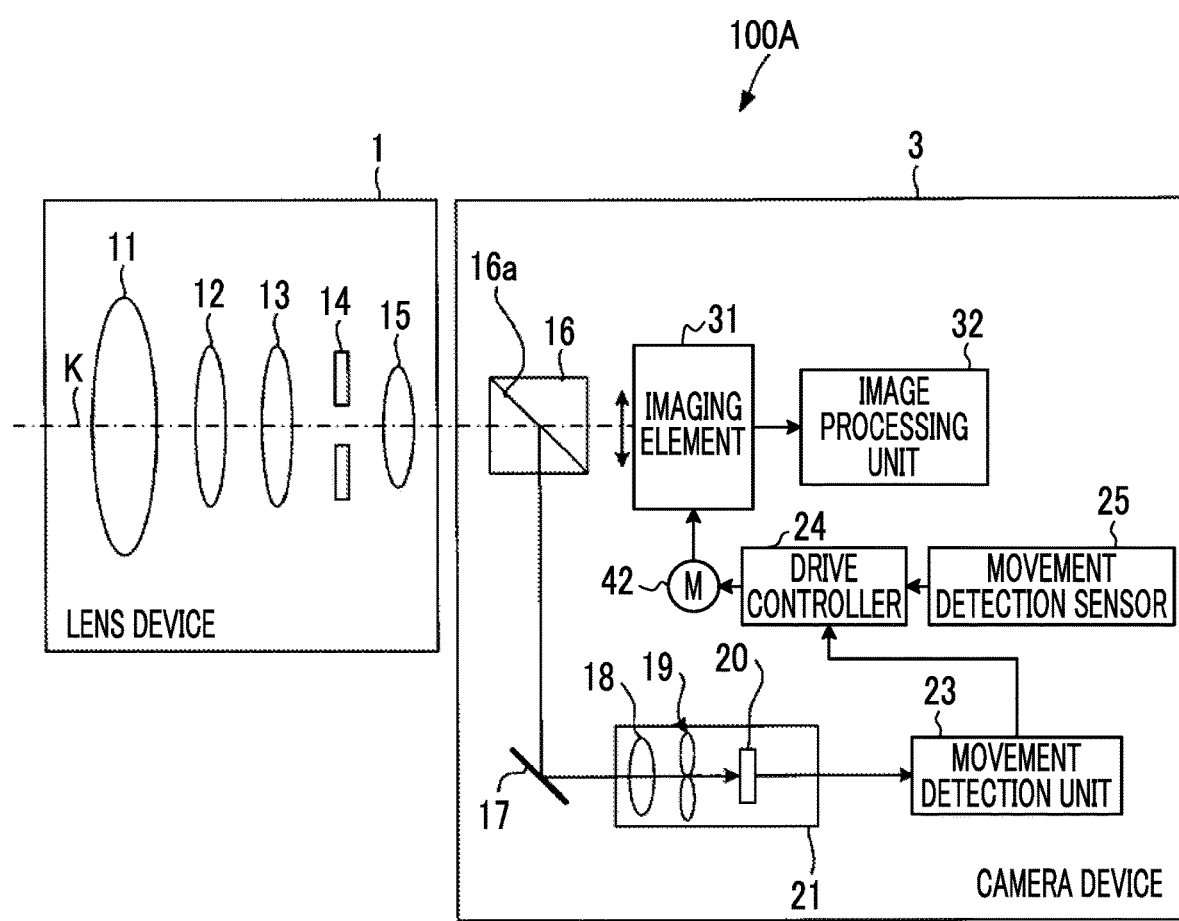
FIG. 4 is a schematic diagram showing a schematic configuration of a camera system 100A which is a modification example of the camera system 100 shown in FIG. 1.

FIG. 4 is a schematic diagram showing a schematic configuration of a camera system 100A which is a modification example of the camera system 100 shown in FIG. 1. For example, the camera system 100A is a digital camera having an interchangeable lens device 1 or a digital camera having a fixed lens device 1.

In the camera system 100A, the beam splitter 16, the mirror 17, the light detection unit 21, the movement detection unit 23, the drive controller 24, and the movement detection sensor 25 within the lens device 1 shown in FIG. 1 are built in the camera device 3. The shake correction lens 10 and the drive mechanism 22 are removed from the lens device 1.

The imaging element 31 of the camera device 3 is configured to be movable in a plane perpendicular to the optical axis of the lens device 1. A drive mechanism 42 which drives the imaging element 31 and controls incidence positions of subject light rays incident on the light receiving surface of the imaging element 31 through the imaging optical system of the lens device 1 on the light receiving surface is added to the camera device 3. The imaging element 31 constitutes a driven member driven by the drive mechanism 42.

In the camera system 100A, the shake correction device is constituted by the beam splitter 16, the sensor 20, the movement detection unit 23, the drive controller 24, the drive mechanism 42, and the movement detection sensor 25.

The beam splitter 16 of the camera device 3 is disposed so as to be closer to the subject than the imaging element 31 on the optical axis K of the imaging optical system, and an optical path of subject light rays incident on the imaging optical system is divided into a first optical path which leads to the imaging element 31 and a second optical path which leads to the mirror 17 in a position closer to the subject than the imaging element 31.

The drive controller 24 of the camera device 3 corrects the shake of the captured image captured by the imaging element 31 by calculating the first movement of the camera device 3 on the basis of the signal corresponding to the movement of the camera device 3 output from the movement detection sensor 25 and moving the imaging element 31 by controlling the drive mechanism 42 on the basis of the first movement and the second movement of the camera device 3 input from the movement detection unit 23.

As mentioned above, even in a case where the shake correction device drives the imaging element 31 and thus, the shake correction is performed, it is possible to perform the shake correction with high accuracy by correcting the error of the first movement of the camera device 3 calculated on the basis of the output of the movement detection sensor 25.

Although the shake correction is performed by driving a part of lenses included in the imaging optical system within the lens device 1 or the imaging element 31 included in the camera device 3 in the aforementioned description, the shake correction may be performed by driving both the lenses and the imaging element.

For example, in the camera system 100 of FIG. 1, the imaging element 31 is configured to be movable in a plane perpendicular to the optical axis K, and an imaging element drive mechanism that drives the imaging element 31 is added to the camera device 3. The drive controller 24 performs the shake correction by controlling the drive mechanism 22 and the imaging element drive mechanism on the basis of the first movement and the second movement and driving the shake correction lens 10 and the imaging element 31. According to this configuration, it is possible to perform the shake correction at a high speed by moving the shake correction lens 10 and the imaging element 31.

As described above, the following matters are disclosed in this specification.

(1) There is provided a shake correction device that corrects a shake of a captured image captured by an imaging element which images subjects through an imaging optical system. The device comprises a movement detection sensor that outputs a signal corresponding to a movement of the shake correction device, a drive mechanism that controls positions of subject light rays incident on a light receiving surface of the imaging element by driving at least one of a part of lenses included in the imaging optical system or the imaging element, an optical element that divides an optical path of subject light rays incident on the imaging optical system into a first optical path which leads to the imaging element and a second optical path other than the first optical path in a position closer to the subject than a driven member driven by the drive mechanism, a subject light detection unit that detects the subject light rays which are incident on the imaging optical system and travel through the second optical path, a movement detection unit that detects the movement of the shake correction device on the basis of the subject light rays detected by the subject light detection unit, and a drive controller that controls the drive mechanism on the basis of a first movement of the shake correction device based on the signal and a second movement detected by the movement detection unit.

(2) In the shake correction device according to (1), in a case where the first movement and the second movement are different, the drive controller controls the drive mechanism on the basis of a drive amount obtained by correcting a drive amount of the driven member based on the first movement on the basis of the second movement.

(3) In the shake correction device according to (2), the drive controller corrects the drive amount of the driven member based on the first movement by performing an offset correction process of correcting an offset of a signal output from the movement detection sensor and an amplification process of amplifying the signal obtained after the offset correction process, calculating the first movement on the basis of the signal obtained after the amplification process, and correcting at least one of an offset value to be subtracted from the signal in the offset correction process or a gain to be multiplied by the signal in the amplification process on the basis of a difference between the first movement and the second movement.

(4) In the shake correction device according to any one of (1) to (3), the subject light detection unit is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and the movement detection unit calculates distances of the subjects formed on the sensor from the imaging optical system on the basis of output signals of the sensor, and detects the movement amount as the second movement in a case where a movement amount of the subject of which the distance is maximum exceeds a threshold value.

(5) In the shake correction device according to (4), the movement detection unit detects the second movement as a zero in any one of a case where the movement amount of the subject of which the distance is maximum is equal to or less than the threshold value or a case where the movement amount of the subject of which the distance is maximum exceeds a greater threshold value than the threshold value.

(6) There is provided a lens device comprising the shake correction device according to any one of (1) to (5), and the imaging optical system.

(7) There is provided an imaging device comprising the shake correction device according to any one of (1) to (5); and the imaging element.

(8) There is provided a shake correction method using a shake correction device that corrects a shake of a captured image captured by an imaging element which images subjects through an imaging optical system. The shake correction device includes a movement detection sensor that outputs a signal corresponding to a movement of the shake correction device, a drive mechanism that controls positions of subject light rays incident on a light receiving surface of the imaging element by driving at least one of a part of lenses included in the imaging optical system or the imaging element, and an optical element that divides an optical path of subject light rays incident on the imaging optical system into a first optical path which leads to the imaging element and a second optical path other than the first optical path in a position closer to the subject than a driven member driven by the drive mechanism. The method comprises a movement detection step of detecting the movement of the shake correction device on the basis of the subject light rays which are incident on the imaging optical system and travel through the second optical path, and a drive control step of controlling the drive mechanism on the basis of a first movement of the shake correction device based on the signal and a second movement detected in the movement detection step.

(9) In the shake correction method according to (8), in the drive control step, in a case where the first movement and the second movement are different, the drive mechanism is controlled on the basis of a drive amount obtained by correcting a drive amount of the driven member based on the first movement on the basis of the second movement.

(10) In the shake correction method according to (9), in the drive control step, the drive amount of the driven member based on the first movement is corrected by performing an offset correction process of correcting an offset of a signal output from the movement detection sensor and an amplification process of amplifying the signal obtained after the offset correction process, calculating the first movement on the basis of the signal obtained after the amplification process, and correcting at least one of an offset value to be subtracted from the signal in the offset correction process or a gain to be multiplied by the signal in the amplification process on the basis of a difference between the first movement and the second movement.

(11) In the shake correction method according to any one of (8) to (10), the shake correction device includes a subject light detection unit that detects the subject light rays which are incident on the imaging optical system and travel through the second optical path, the subject light detection unit is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and in the movement detection step, distances of the subjects formed on the sensor from the imaging optical system are calculated on the basis of output signals of the sensor, and the movement amount is detected as the second movement in a case where a movement amount of the subject of which the distance is maximum exceeds a threshold value.

(12) In the shake correction method according to (11), in the movement detection step, the second movement is detected as a zero in any one of a case where the movement amount of the subject of which the distance is maximum is equal to or less than the threshold value or a case where the movement amount of the subject of which the distance is maximum exceeds a greater threshold value than the threshold value.

(13) There is provided a shake correction program causing a computer of a shake correction device that corrects a shake of a captured image captured by an imaging element which images subjects through an imaging optical system to perform a shake correction method. The shake correction device includes a movement detection sensor that outputs a signal corresponding to a movement of the shake correction device, a drive mechanism that controls positions of subject light rays incident on a light receiving surface of the imaging element by driving at least one of a part of lenses included in the imaging optical system or the imaging element, and an optical element that divides an optical path of subject light rays incident on the imaging optical system into a first optical path which leads to the imaging element and a second optical path other than the first optical path in a position closer to the subject than a driven member driven by the drive mechanism. The shake correction method comprises a movement detection step of detecting the movement of the shake correction device on the basis of the subject light rays which are incident on the imaging optical system and travel through the second optical path, and a drive control step of controlling the drive mechanism on the basis of a first movement of the shake correction device based on the signal and a second movement detected in the movement detection step.

(14) There is provided a shake correction device that corrects a shake of a captured image captured by an imaging element which images subjects through an imaging optical system. The device comprises a movement detection sensor that outputs a signal corresponding to a movement of the shake correction device, a drive mechanism that controls positions of subject light rays incident on a light receiving surface of the imaging element by driving at least one of a part of lenses included in the imaging optical system or the imaging element, an optical element that divides an optical path of subject light rays incident on the imaging optical system into a first optical path which leads to the imaging element and a second optical path other than the first optical path in a position closer to the subject than a driven member driven by the drive mechanism, a subject light detection unit that detects the subject light rays which are incident on the imaging optical system and travel through the second optical path, and a processor that detects a second movement of the shake correction device on the basis of the subject light rays detected by the subject light detection unit, and controls the drive mechanism on the basis of a first movement of the shake correction device based on the signal and the second movement.

It is possible to achieve high quality of a captured image by applying a shake correction device of the present invention to a lens device or a digital camera used in a camera system for broadcasting.

Although the invention has been described above by a specific embodiment, the invention is not limited to the embodiment, and various modifications may be made without departing from the technical spirit of the invention disclosed herein.

This application is based on Japanese Patent Application (2016-174393), filed Sep. 7, 2016, the content of which is incorporated herein.

EXPLANATION OF REFERENCES 100, 100A: camera system
1: lens device
10: shake correction lens
11: focus lens
12, 13: zoom lens
14: stop
15: master lens group
16: beam splitter
17: mirror
18: condenser lens
19: separator lens
20: sensor
21: light detection unit
22, 42: drive mechanism
23: movement detection unit
24: drive controller
25: movement detection sensor
3: camera device
31: imaging element
32: image processing unit

What is claimed is:

1. A shake correction device that corrects a shake of a captured image captured by an imager which images subjects through an imaging optical system, the device comprising:
 a movement detection sensor that outputs a signal corresponding to a movement of the shake correction device;
 a drive mechanism that controls positions of subject light rays incident on a light receiving surface of the imager by driving the imager;
 an optical splitter that divides an optical path of subject light rays into a first optical path which leads to the imager and a second optical path other than the first optical path in a position closer to the subject than a driven member driven by the drive mechanism;
 a subject light detector that receives the subject light rays which travel through the second optical path and outputs image signals of the subject light images formed on the light receiving surface; and
 a processor, configured to:
  detect the movement of the shake correction device based on the image signals of the subject light detector; and
  control the drive mechanism based on a first movement of the shake correction device based on the signal outputted from the movement detection sensor and a second movement detected by the processor, wherein the processor calculates distances of the subjects formed on the light receiving surface of the subject light detector from the imaging optical system based on output signals of the subject light detector, and detects the movement amount as the second movement in a case where a movement amount of the subject of which the distance is maximum exceeds a threshold value.

2. The shake correction device according to claim 1, wherein, in a case where the first movement and the second movement are different, the processor controls the drive mechanism based on a drive amount obtained by correcting a drive amount of the driven member based on the first movement based on the second movement.

3. The shake correction device according to claim 2, wherein the processor corrects the drive amount of the driven member based on the first movement by performing an offset correction process of correcting an offset of a signal output from the movement detection sensor and an amplification process of amplifying the signal obtained after the offset correction process, calculating the first movement based on the signal obtained after the amplification process, and correcting at least one of an offset value to be subtracted from the signal in the offset correction process or a gain to be multiplied by the signal in the amplification process based on a difference between the first movement and the second movement.

4. The shake correction device according to claim 3, wherein the subject light detector is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and the processor calculates distances of the subjects foiiiied on the sensor from the imaging optical system based on output signals of the sensor, and detects the movement amount as the second movement in a case where a movement amount of the subject of which the distance is maximum exceeds a threshold value.

5. The shake correction device according to claim 4, wherein the processor detects the second movement as a zero in any one of a case where the movement amount of the subject of which the distance is maximum is equal to or less than the threshold value or a case where the movement amount of the subject of which the distance is maximum exceeds a greater threshold value than the threshold value.

6. The shake correction device according to claim 2, wherein the subject light detector is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and the processor calculates distances of the subjects formed on the sensor from the imaging optical system based on output signals of the sensor, and detects the movement amount as the second movement in a case where a movement amount of the subject of which the distance is maximum exceeds a threshold value.

7. The shake correction device according to claim 6, wherein the processor detects the second movement as a zero in any one of a case where the movement amount of the subject of which the distance is maximum is equal to or less than the threshold value or a case where the movement amount of the subject of which the distance is maximum exceeds a greater threshold value than the threshold value.

8. The shake correction device according to claim 1, wherein the subject light detector is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and the processor calculates distances of the subjects formed on the sensor from the imaging optical system based on output signals of the sensor, and detects the movement amount as the second movement in a case where a movement amount of the subject of which the distance is maximum exceeds a threshold value.

9. The shake correction device according to claim 8, wherein the processor detects the second movement as a zero in any one of a case where the movement amount of the subject of which the distance is maximum is equal to or less than the threshold value or a case where the movement amount of the subject of which the distance is maximum exceeds a greater threshold value than the threshold value.

10. A lens device comprising:
the shake correction device according to claim 1; and
the imaging optical system.

11. An imaging device comprising:
the shake correction device according to claim 1; and
the imager.

12. A shake correction method using a shake correction device that corrects a shake of a captured image captured by an imager which images subjects through an imaging optical system, the shake correction device including a movement detection sensor that outputs a signal corresponding to a movement of the shake correction device, a drive mechanism that controls positions of subject light rays incident on a light receiving surface of the imager by driving the imager, and an optical splitter that divides an optical path of subject light rays into a first optical path which leads to the imager and a second optical path other than the first optical path in a position closer to the subject than a driven member driven by the drive mechanism and a subject light detector that receives the subject light rays which travel through the second optical path and outputs image signals of subject light images formed on the light receiving surface, the method comprising:

a movement detection step of detecting the movement of the shake correction device based on the image signals of the subject light detector, and a drive control step of controlling the drive mechanism based on a first movement of the shake correction device based on the signal output from the movement detection sensor, and a second movement detected in the movement detection step, wherein in the movement detection step, distances of the subjects formed on the light receiving surface of the subject light detector from the imaging optical system are calculated based on output signals of the subject light detector, and the movement amount is detected as the second movement in a case where a movement amount of the subject of which the distance is maximum exceeds a threshold value.

13. The shake correction method according to claim 12, wherein, in the drive control step, in a case where the first movement and the second movement are different, the drive mechanism is controlled based on a drive amount obtained by correcting a drive amount of the driven member based on the first movement based on the second movement.

14. The shake correction method according to claim 13, wherein, in the drive control step, the drive amount of the driven member based on the first movement is corrected by performing an offset correction process of correcting an offset of a signal output from the movement detection sensor and an amplification process of amplifying the signal obtained after the offset correction process, calculating the first movement based on the signal obtained after the amplification process, and correcting at least one of an offset value to be subtracted from the signal in the offset correction process or a gain to be multiplied by the signal in the amplification process based on a difference between the first movement and the second movement.

15. The shake correction method according to claim 14, wherein the subject light detector is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and in the movement detection step, distances of the subjects formed on the sensor from the imaging optical system are calculated based on output signals of the sensor, and the movement amount is detected as the second movement in a case where a movement amount of the subject of which the distance is maximum exceeds a threshold value.

16. The shake correction method according to claim 15, wherein, in the movement detection step, the second movement is detected as a zero in any one of a case where the movement amount of the subject of which the distance is maximum is equal to or less than the threshold value or a case where the movement amount of the subject of which the distance is maximum exceeds a greater threshold value than the threshold value.

17. The shake correction method according to claim 13, wherein the subject light detector is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and in the movement detection step, distances of the subjects formed on the sensor from the imaging optical system are calculated based on output signals of the sensor, and the movement amount is detected as the second movement in a case where a movement amount of the subject of which the distance is maximum exceeds a threshold value.

18. The shake correction method according to claim 17, wherein, in the movement detection step, the second movement is detected as a zero in any one of a case where the movement amount of the subject of which the distance is maximum is equal to or less than the threshold value or a case where the movement amount of the subject of which the distance is maximum exceeds a greater threshold value than the threshold value.

19. The shake correction method according to claim 12, wherein the subject light detector is a sensor that has a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, and is disposed on the second optical path, and in the movement detection step, distances of the subjects formed on the sensor from the imaging optical system are calculated based on output signals of the sensor, and the movement amount is detected as the second movement in a case where a movement amount of the subject of which the distance is maximum exceeds a threshold value.

20. The shake correction method according to claim 19, wherein, in the movement detection step, the second movement is detected as a zero in any one of a case where the movement amount of the subject of which the distance is maximum is equal to or less than the threshold value or a case where the movement amount of the subject of which the distance is maximum exceeds a greater threshold value than the threshold value.

21. A non-transitory computer readable medium storing a shake correction program causing a computer of a shake correction device that corrects a shake of a captured image captured by an imager which images subjects through an imaging optical system to perform a shake correction method, wherein the shake correction device includes a movement detection sensor that outputs a signal corresponding to a movement of the shake correction device, a drive mechanism that controls positions of subject light rays incident on a light receiving surface of the imager by driving the imager, and an optical splitter that divides an optical path of subject light rays into a first optical path which leads to the imager and a second optical path other than the first optical path in a position closer to the subject than a driven member driven by the drive mechanism, and a subject light detector that receives the subject light rays which travel through the second optical path and outputs image signals of subject light images formed on the light receiving surface, the shake correction method comprising:

a movement detection step of detecting the movement of the shake correction device based on the image signals of the subject light images, and a drive control step of controlling the drive mechanism based on a first movement of the shake correction device based on the signal output from the movement detection sensor and a second movement detected in the movement detection step, wherein in the drive control step, distances of the subjects formed on the light receiving surface of the subject light detector from the imaging optical system are calculated based on output signals of the subject light detector, and the movement amount is detected as the second movement in a case where a movement amount of the subject of which the distance is maximum exceeds a threshold value.

* * * * *